US008698671B2

(12) United States Patent
Sridhara et al.

(10) Patent No.: US 8,698,671 B2
(45) Date of Patent: Apr. 15, 2014

(54) BINNING VENUES INTO CATEGORIES BASED ON PROPAGATION CHARACTERISTICS

(75) Inventors: Vinay Sridhara, Santa Clara, CA (US); Saumitra Mohan Das, San Jose, CA (US); Ayman Fawzy Naguib, Santa Clara, CA (US); Manasi Deepak Navare, Boulder, CO (US); Alok Aggarwal, Foster City, CA (US)

(73) Assignee: QUALCOMM Incorporated, San Diego, CA (US)

(*) Notice: Subject to any disclaimer, the term of this patent is extended or adjusted under 35 U.S.C. 154(b) by 363 days.

(21) Appl. No.: 12/904,896

(22) Filed: Oct. 14, 2010

(65) Prior Publication Data

US 2011/0090123 A1 Apr. 21, 2011

Related U.S. Application Data

(60) Provisional application No. 61/252,397, filed on Oct. 16, 2009.

(51) Int. Cl.
*G01S 5/02* (2010.01)
(52) U.S. Cl.
CPC ............. *G01S 5/0252* (2013.01); *G01S 5/0278* (2013.01)
USPC ........................................................ 342/451
(58) Field of Classification Search
CPC ............................. G01S 5/0252; G01S 5/0278
USPC ........................................................ 342/451
See application file for complete search history.

(56) References Cited

U.S. PATENT DOCUMENTS

| 6,640,089 | B1 * | 10/2003 | Kanaan et al. | 455/67.16 |
|---|---|---|---|---|
| 6,799,047 | B1 * | 9/2004 | Bahl et al. | 455/456.1 |
| 6,973,622 | B1 * | 12/2005 | Rappaport et al. | 715/735 |
| 6,985,839 | B1 * | 1/2006 | Motamedi et al. | 703/6 |
| 2005/0124354 | A1 * | 6/2005 | Durgin | 455/456.1 |
| 2007/0049295 | A1 * | 3/2007 | Soliman et al. | 455/456.3 |
| 2007/0149216 | A1 * | 6/2007 | Misikangas | 455/456.1 |
| 2008/0057873 | A1 * | 3/2008 | Huang et al. | 455/67.11 |
| 2010/0039929 | A1 | 2/2010 | Cho et al. | |

FOREIGN PATENT DOCUMENTS

| CN | 1925667 A | 3/2007 | |
|---|---|---|---|
| CN | 101288002 A | 10/2008 | |
| CN | 101352061 A | 1/2009 | |
| CN | 101373215 A | 2/2009 | |
| TW | 200913576 A | 3/2009 | |
| TW | 200941026 A | 10/2009 | |
| WO | WO 2004008796 A1 * | 1/2004 | H04Q 7/38 |
| WO | WO2007118518 | 10/2007 | |

OTHER PUBLICATIONS

International Search Report—PCT/US2010/052908, international Search Authority, European Patent Office, Dec. 30, 2010.

(Continued)

*Primary Examiner* — Gregory C Issing
(74) *Attorney, Agent, or Firm* — Arnold J. Gum

(57) ABSTRACT

Example methods, apparatuses, or articles of manufacture are disclosed herein that may be utilized to facilitate or otherwise support one or more processes or operations in connection with defining and determining a plurality of venue types and binning a plurality of venues into categories based, at least in part, on signal propagation characteristics associated with such venues.

34 Claims, 7 Drawing Sheets

(56) References Cited

OTHER PUBLICATIONS

Ji, Yiming; Biaz, Saad; Computer Science and Software Engineering Auburn University, "ARIADNE: A Dynamic Indoor Signal Map Construction and Localization System," MobiSys 2006, Jun. 19-22, 2006, Uppsala, Sweden, pp. 151-164.

P. Pechac, M. Klepal, Radioengineering, "Empirical Models for Indoor Propagation in CTU Prague Buildings," vol. 9, No. 1, Apr. 2000, pp. 31-36.

Subramanian, Suguna P. et al.. University of Tubingen, Department of Computer Engineering, "SBIL: Scalable Indoor Localization and Navigation Service," IEEE 2007.

Written Opinion—PCT/US2010/052908, International Search Authority, European Patent Office, Dec. 30, 2010.

Taiwan Search Report—TW099135278—TIPO—Mar. 13, 2013.

* cited by examiner

BINNING VENUES INTO CATEGORIES BASED ON PROPAGATION CHARACTERISTICS

CLAIM OF PRIORITY UNDER 35 U.S.C. §119

This application claims priority under 35 USC 119 to U.S. Provisional Application Ser. No. 61/252,397, filed Oct. 16, 2009, and entitled "Binning Buildings into Different Categories Based on Propagation Characteristics," which is assigned to the assignee hereof and which is incorporated herein by reference.

BACKGROUND

1. Field

The present disclosure relates generally to indoor navigation or location systems for mobile communication devices and, more particularly, to binning venues into categories based, at least in part, on propagation characteristics of such venues for use in or with mobile communication devices.

2. Information

Certain mobile communication devices, such as, for example, location-aware cellular telephones, smart telephones, or the like may assist users in estimating their geographic location by providing suitable or desired navigation or positioning information obtained or gathered from various systems. One such system may include, for example, a satellite positioning system (SPS), such as the Global positioning system (GPS) or other like Global Navigation Satellite System (GNSS) comprising a number of Earth-orbiting satellites or space vehicles (SVs) capable of transmitting wireless signals to and receiving such signals from one or more suitable wireless transmitters or receivers, terrestrial or otherwise.

In an outdoor environment, certain mobile communication devices may estimate their relative locations based, at least in part, on wireless signals received or acquired from such SVs or, in some instances, terrestrial transmitters (e.g. base stations, access points, location beacons, etc.) via a cellular telephone or other wireless communications networks. Received wireless signals may be processed in some manner by a mobile communication device, and a relative geographical location may be estimated, for example, using one or more applicable position estimation techniques. In some instances, such techniques may include multiple signal-based position estimation, such as trilateration, for example, wherein a mobile communication device may utilize point-to-point distances or ranges measured from such a mobile communication device to one or more wireless transmitters positioned at known fixed locations. Alternatively, a position of a mobile communication device may be estimated using a heat map signature matching technique, for example, in which characteristics of wireless signals or signal signatures received at a mobile communication device are compared with expected signatures of such characteristics stored as heat map values in a database, wherein the individual signal signatures stored in the database are associated with particular locations. By finding a signature in a database that most closely matches characteristics exhibited by wireless signals received at a mobile device, a location associated with a matching signature may be used as an estimated location of a mobile device.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
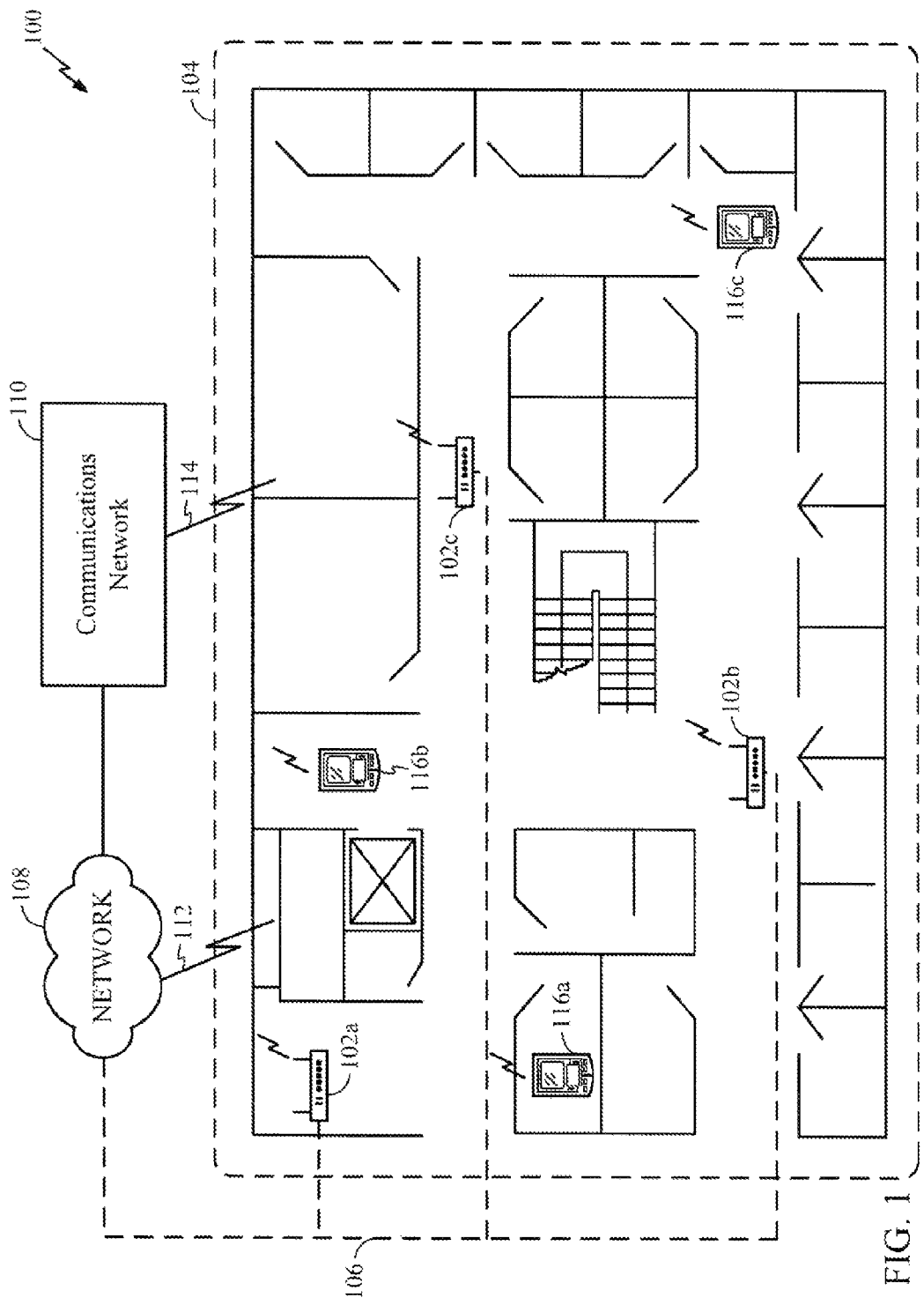
FIG. 1 is a schematic diagram illustrating certain features associated with an example operating environment according to an implementation.

Example implementations relate to binning venues into categories based, at least in part, on propagation characteristics. In one implementation, a method may comprise defining a plurality of venue types, and determining, for one or more of such a plurality of venue types, an observed signal parameter model based, at least in part, on radio frequency (RF) measurements obtained at one or more predetermined locations in a plurality of venues of at least one of such plurality of venue types. A particular venue, such as a present or new venue, for example, may be associated with one of such a plurality of such venue types based, at least in part, on one or more RF signal propagation characteristics associated with such one of such a plurality of such venue types. In another implementation, a method may comprise receiving, at a mobile device coupled to a memory, assistance information associated with an observed signal parameter model applicable to a selected one of a plurality of venue types, and estimating a location based, at least in part, on an application of such an observed signal parameter model to one or more signals received at such a mobile device while positioned in a present venue of such selected one of such plurality of venue types. In another implementation, a method may comprise accessing assistance information generated based, at least in part, on RF measurements obtained at one or more locations in a venue consistent with a venue type of a plurality of venue types, and providing such assistance information for use by at least one mobile device to estimate its location while in a present venue, wherein such a present venue is of the venue type. It should be understood, however, that these are merely particular example implementations, and that claimed subject matter is not limited in this regard. In another implementation, an apparatus may comprise one or more processors programmed with instructions to: define a plurality of venue types; and determine, for one or more of said plurality of said venue types, an observed signal parameter model based, at least in part, on radio frequency (RF) measurements obtained at one or more predetermined locations in a plurality of venues of at least one of said plurality of venue types. In another implementation, an apparatus may comprise: means for defining a plurality of venue types; and means for determining, for one or more of said plurality of said venue types, an observed signal parameter model based, at least in part, on radio frequency (RF) measurements obtained at one or more predetermined locations in a plurality of venues of at least one of said plurality of venue types. In another implementation an article may be comprised of: a storage medium having instructions stored thereon executable by a special purpose computing platform to: define a plurality of venue types; and determine, for one or more of said plurality of said venue types, an observed signal parameter model based, at least in part, on radio frequency (RF) measurements obtained at one or more predetermined locations in a plurality of venues of at least one of said plurality of venue types.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be used to facilitate or support one or more processes or operations in connection with binning venues into categories based, at least in part, on signal propagation characteristics associated with such venues. As used herein, "binning" may refer to a technique or process of associating a venue with a particular type or category of venues of a set of discrete types or categories of venues treated as "bins." As will be described in greater detail below, a bin may categorize a number of venues having similar radio channel propagation characteristics due to, for example, similar physical geometry of a propagation space associated with such venues. "Venue," as the term used herein, may refer to a physical place or locale that may be associated with the whereabouts of an object or thing (e.g., a user, mobile device, heat map generation tool, etc.) according to a desired or suitable point of reference represented, for example, via geographic coordinates (e.g., latitude, longitude, etc.), a street address, governmental jurisdiction, postal zip code, name, or the like. Optionally or alternatively, a venue may also include references to an altitude, time, direction, distance, etc., just to illustrate another possible implementation. Of course, these are merely examples, and claimed subject matter is not limited in these respects. As will also be seen, depending on an implementation, venues may comprise, for example, various partially or substantially enclosed areas associated with an indoor environment (e.g., a building, general area(s) within a building, etc.), outdoor environment (e.g., urban canyons, etc.), or any combination thereof. By way of example but not limitation, venues may comprise, for example, an office building, a convention center, an auditorium, an amphitheater, a warehouse, a classroom building, a theater, a supermarket, a shopping mall, a sports arena, a stadium, a transit station terminal, a library, etc., just to name a few examples. Again, claimed subject matter is not so limited, of course.

As was indicated, example methods, apparatuses, or articles of manufacture presented herein may be implemented, in whole or in part, for use in or with mobile communication devices featuring, for example, a location or navigation capability. As used herein, "mobile device," "mobile communication device," "hand-held device," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, which may herein be called simply mobile devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, or the like. It should be appreciated, however, that these are merely illustrative examples relating to mobile devices that may be utilized to facilitate or support one or more processes or operations in connection with binning venues into categories, and that claimed subject matter is not limited in this regard.

In certain situations, such as in an indoor environment or like partially or substantially enclosed areas (e.g., urban canyons, etc.) mobile devices may be unable to reliably receive or acquire requisite wireless signals to facilitate or support one or more position estimation techniques, for example, so as to enable location or navigation services. For example, in certain venues, signals from SVs or other wireless transmitters may be attenuated or otherwise affected in some manner (e.g., insufficient, weak, fragmentary, etc.), which may preclude their use in a given position estimation technique. As such, in some instances, positioning or navigation capabilities of certain mobile communication devices may be less useful or possibly faulty. Thus, it may be desirable to develop one or more methods, systems, or apparatuses that may enable location or navigation services in an indoor or like environment in an effective or efficient manner so as to facilitate or support a more reliable, accurate, useful, or otherwise more robust positioning or navigation capability of certain mobile communication devices.

Accordingly, in an indoor or like environment, different techniques may be employed, for example, to enable navigation or location services. For example, a mobile device may employ a trilateration-based approach, in which a mobile device may estimate its location using point-to-point distances or ranges measured from the mobile device to three or more terrestrial wireless transmitters positioned at known or reported locations (e.g., within a venue, etc.). In an implementation, to obtain estimates of a location or enable trilateration-based indoor navigation or location services, a mobile device may receive, for example, assistance information from a suitable server (e.g., location server, navigation server, information server, etc.). As will be described in greater detail below, such assistance information may comprise, for example, identities or locations of available wireless transmitters (e.g., access points, location beacons, femtocells, etc.) positioned at known fixed locations within a venue, as well as one or more binned parameters or constants associated with a particular observed signal parameter model. It should be appreciated that any suitable position determination technique or operation may be utilized to facilitate or support position estimations. For example, one or more triangulation, multilateration, etc. operations may be utilized using signals received from various wireless transmitters to determine an estimate for a position of a mobile device.

As used herein, "binned parameter" or "binned constant" may refer to a multiplicative factor or like functional unit or coefficient having a constant value and accounting for venue-specific features of physical radio channels associated with a particular type or category of venue of a set of discrete types or categories of venues (e.g., bins). As discussed below, in one particular implementation, binned parameters may comprise, for example, a number of constants that fit a type or category of a venue based, at least in part, on an assumption concerning a physical geometry of a propagation space associated with such a venue. Binned parameters may be utilized, for example, to generate heat map information or, optionally or alternatively, may be communicated to a mobile device in the form of assistance information to allow for a sufficiently accurate position fix, as will also be seen. Of course, such details relating to binned parameters are merely examples, and claimed subject matter is not so limited. Certain aspects of example binned parameters of interest will be described in greater detail below with reference to FIG. 2.

As also discussed below, an observed signal parameter model may be implemented, for example, as a look-up mathematical formula or table forwarded to a mobile device as part of assistance information from a suitable server and defining a functional relationship between a certain received or observed wireless signal characteristic and a range to a wireless transmitter. For example, in one particular implementation, an observed wireless signal characteristic to measure such a range via a trilateration-based operation may comprise a signal strength expressed as a received signal strength indicator (RSSI) of the Institute of Electrical and Electronics Engineers (IEEE) wireless local access network (WLAN) standard 802.11, though claimed subject matter is not so limited. Thus, using such assistance information, a mobile device may perform requisite calculations to obtain one or more range measurements and estimate its position with sufficient accuracy utilizing, for example, known trilateration-based techniques. For purposes of explanation, here, a range to a wireless transmitter may be estimated, at least in part, by acquiring a Media Access Control identifier (MAC ID) address from signals received from such a wireless transmitter, for example, and measuring one or more detectable range-based or range-dependent characteristics of received wireless signals (e.g., signal strength, round-trip delay, etc.). Identities or locations of wireless transmitters may be obtained, for example, from any suitable wireless transmitter mapping services database (e.g., wireless mapping almanacs, etc.) or directly from a venue operator. As was indicated, "venue" may refer to a locale, building, etc., general area within such a locale, building, etc., or other partially or substantially enclosed area (e.g., urban canyons, etc.), and "location" may refer to a particular or specific position of a mobile device within such a venue (e.g., a grid point, point of interest, etc.). Of course, such details are merely examples, and the scope of claimed subject matter is not limited in this respect.

Another possible approach to estimate a position of a mobile device in an indoor or like environment may include, for example, performing one or more heat map or radio map signature matching techniques. For example, one or more characteristics of wireless signals, referred herein to as "signal signatures" or simply "signatures," received at a mobile device may be compared with expected signatures of such characteristics stored as heat map or radio map values in a suitable database (e.g., at a mobile device, information server, location server, etc.), wherein the individual signal signatures stored in the database are associated with one or more predetermined locations. As used herein, "predetermined location" may refer to one or more previously measured, estimated, approximated, predicted, simulated, etc. locations that may be associated with a stored expected signature of one or more observed characteristics of received wireless signals. As will be seen, such characteristics may be measured utilizing one or more suitable or desired processes or techniques, such as, for example, fingerprinting, ray tracing, etc., though claimed subject matter is not limited to one particular process or technique. Observed characteristics of received wireless signals may be expressed, for example, by one or more integer values, such as received signal strength indicator (RSSI), round-trip time (RTT) or round-trip delay (RTD), etc., just to name a few examples. By finding a signature in a database that most closely matches characteristics exhibited by wireless signals received at a mobile device, a location associated with a matching signature may be used as an estimated location of a mobile device. Of course, this is merely an example relating to heat map or radio map signature matching, and claimed subject matter is not so limited.

As was indicated, in an implementation, to facilitate or support heat map or radio map signature matching, an indoor navigation or location system may provide a mobile device with assistance information from a suitable server (e.g., location, navigation, information server, etc.). Here, assistance information may comprise, for example, previously measured heat map or radio map values, which may herein be referred to as heat map information, so as to facilitate or support measurements of ranges to one or more wireless transmitters positioned at known locations. As previously mentioned, such ranges may be estimated, for example, by acquiring a MAC ID address of a wireless transmitter and measuring one or more observed or received range-based or range-dependent signal characteristics (e.g., signal strength, round-trip delay, etc.). In this illustrated example, a MAC ID address may be associated with a signal signature at a predetermined location obtained by a mobile device with respect to a known or reported wireless transmitter (e.g., WLAN, Bluetooth, etc.), though claimed subject matter is not so limited.

Thus, in an indoor or like environment, for a given mobile device, a position estimate, which may also be referred herein to as a "position fix," may be obtained based, at least in part, on assistance information provided to the mobile device, as previously mentioned. Such assistance information may include, for example, heat map or radio map information as well as one or more binned parameters associated with an applicable observed signal parameter model so as to facilitate or support measurements of ranges to one or more wireless transmitters or like terrestrial ranging or positioning sources at known locations or like position estimation techniques. Certain assistance information, such as, for example, heat map information may be collected or otherwise generated using one or more suitable processes or techniques. For example, in an implementation, a technique known as "RF fingerprinting" or simply "fingerprinting" may be utilized. In fingerprinting, RF measurements may be directly taken or obtained from available access points at each grid point mapped to a floor plan of a particular venue so as to characterize a heat map signal signature at the grid point. Fingerprinting may take into account particularities of a venue's floor plan as well as signal attenuation, reflection, multiple paths, or the like. Collected information may be comprehensive and may be stored in a suitable fingerprinting database in connection with a particular location to facilitate or support one or more signal signature matching processes or operations, as previously described. Because fingerprinting involves an extensive site survey coupled with taking direct measurements and performing significant calculations of multiple parameters or factors (e.g., reflection, attenuation, multi-paths, etc.) for every grid point and available access point on a grid, fingerprinting may be computationally or labor-intensive, time-consuming, or, at times, prohibitively expensive. Of course, these are merely details relating to a fingerprinting technique, and claimed subject matter is not intended to be limited in this regard.

Optionally or alternatively, assistance information may be generated or obtained using, for example, a technique known as "ray tracing," which may attempt to develop a model for associating signaling (e.g., RSSI, etc.) or timing (e.g., RTD, etc.) characteristics of wireless signals at a mobile device with a range to one or more available access points as well as to generate heat map information. Ray tracing may be utilized, at least in part, to simulate indoor radio propagation characteristics, thus, accounting for venue-specific features of indoor radio channels. For example, building materials, density of walls or other signal obstructions, floor plan, layout, etc. of a particular venue may be analyzed to model a range to an access point positioned within such a venue as a function of RSSI, RTD, etc. In one particular implementation, using physical features or characteristics of a venue, expected attenuation of a wireless signal transmitted from an access point may be modeled as a RSSI versus distance function of a range to such an access point, just to illustrate one possible example. A mobile device located in a venue of a particular venue type may then obtain estimates or measurements of a range to access points by applying an attenuation model (e.g., associated with a particular venue type or category) to RSSI of signals received at the mobile device. With knowledge of the locations of access points, a mobile device may estimate its position or location based, at least in part, on these range estimates or measurements to such access points, as discussed above. Ray tracing, however, may require extensive or highly detailed knowledge of building materials, material coefficients, venue interiors (e.g., walls, obstacles, etc.), or the like, which may be relatively difficult to obtain from a certain venue or location, in advance or otherwise. In addition, computer time needed to complete a ray tracing simulation may grow with the number of planes or surfaces within a venue interior. For example, in complex scenarios, an increasing number of planes (e.g., walls, rooms, etc.) may lead to an increasing number of ray reflections, diffractions, or transmissions, thus, making the computational cost or effort very or, at times, prohibitively high. Simulation costs may also increase as a number of wireless receivers is increased, since at least one ray is required for each possible receiver. Of course, details relating to ray tracing are merely examples, and claimed subject matter is not so limited.

In a new or present venue, for example, fingerprinting or ray tracing simulations may be performed anew or "from scratch" to provide adequate or requisite assistance information facilitating or supporting indoor navigation or location services, as previously mentioned. As used herein, "present venue" or "new venue" may be used interchangeably and may refer to one or more venues in which one or more wireless signal characteristics (e.g., signal strength, round-trip delay, etc.) have not been previously measured or otherwise observed. For example, a present venue may comprise a specific venue for which certain information, such as heat map or radio map information, assistance information, information associated with one or more binned parameters, observed signal parameter models, etc. is being sought, generated, developed, or the like. Thus, in one particular implementation, a present venue may comprise, for example, a specific venue to be modeled or simulated using a heat map generation tool, observed signal parameter model generation tool, etc., though claimed subject matter is not so limited. As will be described in greater detail below, such computationally or labor-intensive, time-consuming, or otherwise complex process of generating assistance information anew or "from scratch" may be eliminated or otherwise reduced by binning a new or present venue into a particular category or type, wherein particular types of venues (e.g., with similar propagation characteristics, etc.) may be associated with a particular observed signal parameter model. For example, in certain simulations or experiments, it has been observed that typically, although not necessarily, an RF signal transmitted in a venue (e.g., from a wireless transmitter, etc.) may attenuate differently depending on propagation characteristics of a particular type of a venue. Such characteristics impacting RF signal attenuation may depend, for example, on likely RF interference environment, wall materials, wall density, presence of cubicles in open spaces, age of venue, venue geometry, venue function (e.g., an auditorium, an amphitheater, a warehouse, an office building, a classroom building, a theater, a supermarket, a shopping mall, a convention center, a sports arena, a stadium, a transit station terminal, a library, etc.), just to name a few non-limiting examples. Accordingly, venues of a similar category or type may exhibit similar propagation characteristics or signal attenuation properties and, as such, may be grouped together or binned with respect to a single observed signal parameter model, as described below.

Accordingly, in an implementation, a plurality of venue types or categories may be defined, wherein each venue type or category is associated with its own observed signal parameter model. An observed signal parameter model for a particular venue type may be initially derived, at least in part, from performing one or more simulations discussed in connection with fingerprinting or ray tracing, for example, for a statistically significant number of venues of a particular venue type. As was indicated, an observed signal parameter model may be capable of approximating a range as a function of certain received or observed signal characteristics and may be utilized by a mobile device to obtain a sufficiently accurate position fix by employing one or more position estimation techniques. As will be seen, in one particular implementation, an observed signal parameter model may define a relationship between RSSI of a signal received from a wireless transmitter and a range to such a transmitter, though claimed subject matter is not so limited. Other observed signal characteristics, such as, for example, RTD may also be utilized, in whole or in part, just to illustrate another possible implementation.

As was indicated, an observed signal parameter model may be sent to a mobile device as part of assistance information associated with a particular venue category or type. In a trilateration-based approach, this may be implemented, for example, as a look-up mathematical formula or table forwarded to a mobile device from a suitable server and defining a relationship between venue type-based constants or binned parameters and physical features or characteristics of a particular venue. As described below, such physical features or characteristics may be expressed, for example, as logarithms of distance, number of planes crossed (e.g., wall intersections, etc.), obstacles (e.g., racks, bends, etc), or the like. In an implementation that utilizes a heat map positioning technique, an observed signal parameter model may be used, for example, to effectively or efficiently generate heat map information that may be subsequently communicated to a mobile device as part of assistance information. Such heat map information may be generated, for example, based, at least in part, on an application of an observed signal parameter model reflecting a particular trend of how wireless signals propagate or attenuate in a physical radio channel associated with a specific type or category of venue. Generated heat map information may be subsequently used by one or more mobile devices to perform requisite calculations in connection with heat map signature matching, for example, to allow for a sufficiently accurate position fix, as previously mentioned. For example, in one particular implementation, heat map information or like assistance information may be generated based, at least in part, on RF measurements obtained at one or more locations in a venue similar or consistent with a venue type of a plurality of venue types, as described below. Such assistance information may be accessed or otherwise obtained by a suitable server (e.g., location, navigation, etc.) and may be provided for use by at least one mobile device to estimate its location while in a venue (e.g., new or present, etc.) of the same or similar type. Of course, these are merely examples, and claimed subject matter is not so limited.

Attention is now drawn to FIG. 1, which is a schematic diagram illustrating certain features, functional or otherwise, associated with an example operating environment 100 that may be communicatively enabled to facilitate or support one or more processes or operations in connection with binning venues into categories. It should be appreciated that operating environment 100 is described herein as a non-limiting example, and that one or more processes or operations associated with binning venues into categories may be implemented, in whole or in part, in the context of various communications networks or combination of networks. Such networks may include, for example, public networks (e.g., the Internet, the World Wide Web), private networks (e.g., intranets), wireless local area networks (WLAN), or the like.

As illustrated, operating environment 100 may comprise one or more wireless transmitters 102a, 102b, and 102c, for example, operatively arranged within an example venue or like area of interest 104. Even though only a certain number of wireless transmitters are illustrated, any number of wireless transmitters may be implemented to facilitate or otherwise support one or more techniques or processes associated with operating environment 100. Also, it should be appreciated that the configuration shown is merely an example configuration to which claimed subject matter is not limited. As seen, in an implementation, venue 104 may be defined, for example, by an interior of a venue or a portion thereof, which may have one or more entryways, hallways, cubicles, walls, dividers, staircases, doors, rooms, elevators, or the like. Of course, claimed subject matter is not limited to any particular area, floor plan, interior, size, etc. It should also be noted that the scope of claimed subject matter is not limited to indoor implementations. As was indicated, example implementations described herein may be utilized, partially or substantially, in an indoor environment, outdoor environment, or in any combination thereof that may be associated with all or part of operating environment 100, for example.

Wireless transmitters 102a, 102b, and 102c may all be the same type of device, for example, or represent different types of devices, such as access points, location beacons, base stations, or the like, depending on an implementation. In one particular implementation, wireless transmitters may comprise, for example, one or more access points, which may not only transmit wireless signals but may also receive wireless signals. As indicated generally by dashed line at 106, wireless transmitters may be operatively coupled to a network 108 that may, for example, be representative of one or more wired or wireless communications or computing networks capable of providing suitable or desired information related to operating environment 100, such as assistance information including identities or locations of wireless transmitters, map or venue information, or the like. Map or venue information may comprise, for example, electronic digital map information (e.g., floor plans, etc.) associated with an indoor or like environment or a portion of such environment in connection with a venue or area of interest. Here, by way of non-limiting example, map information may comprise all or part of one or more computer-aided design (CAD) information exchange files relating to venue 104, for example. As a way of illustration, map or venue information may identify one or more structural features of venue 104, for example, such as walls, rooms, doors, passageways, elevators, staircases, ladders, floors, ceilings, or the like. Wireless transmitter location information may comprise, for example, (X,Y, Z) coordinates in three-dimensional Cartesian coordinate space, just to illustrate one possible implementation. Of course, claimed subject matter is not limited in these respects.

In certain example implementations, network 108 may include, for example, the Internet or other like computing or communication resources capable of providing suitable or desired information to one or more mobile devices via one or more wireless communication links, such as a link 112. Such information may include, for example, assistance information in the form of binned parameters associated with a particular observed signal parameter model, heat map information, etc., as previously mentioned. As illustrated, network 108 may be coupled to a communications network 110, which may include, for example, a cellular or other like wireless communications systems or networks (e.g., Wi-Fi, etc.), which may enhance a coverage area for communications, for example, with one or more mobile devices, wireless transmitters, or the like. In one particular implementation, communications network 110 may utilize one or more wireless communication links, as referenced herein by a link 114, so as to provide for femtocell-based or supported operative regions of coverage.

As illustrated generally by a number of lightning bolt-shaped symbols, mobile devices 116a, 116b, and 116c may communicate with network 108 through wireless transmitters 102. Again, even though only a certain number of mobile devices are illustrated, it should be appreciated that any number of mobile devices may be implemented to facilitate or otherwise support one or more techniques or processes associated with operating environment 100. As was indicated, wireless signals may be provided for use by at least one mobile device 116, for example, to facilitate or support navigation or location services based, at least in part, on single or multiple signal-based techniques, such as trilateration, triangulation, heat map or radio map signature matching techniques, or the like. Also, wireless signals may be provided to at least one mobile device 116 for one or more other purposes. For example, one or more mobile devices may be enabled for information pulling or pushing communication techniques or other like information communication processes to obtain venue or map information, access point information, etc., as previously mentioned.

In certain implementations, wireless signals may provide, for example, assistance information to facilitate or support one or more measurements of ranges from at least one mobile device 116 to one or more available wireless transmitters (e.g., 102a, 102b, 102c, etc.) to allow for a sufficiently accurate position fix. In one particular implementation employing trilateration-based position fix, identities or locations of available wireless transmitters (e.g., 102a, 102b, 102c, etc.), for example, as well as one or more binned parameters in connection with a particular observed signal parameter model may be provided. Here, for example, such an observed signal parameter model may be derived for venue 104 based, at least in part, on RF measurements obtained at a venue of a similar type or category, as will be described in greater detail below. An observed signal parameter model may be implemented, for example, as a mathematical formula or look-up table that defines a relationship between one or more observed wireless signal characteristics received from available wireless transmitters 102 and ranges to such transmitters.

As was indicated, in certain implementations, assistance information may be provided to at least one mobile device 116 to facilitate or support heat map-based positioning. Here, assistance information may comprise, for example, suitable or desired heat map information generated for venue 104 using one or more simulations facilitated or supported by operating environment 100. As described below, such heat map information may comprise one or more heat map values associated with a particular grid point and generated using, for example, an observed signal parameter model utilizing binned parameters applicable to a type or category of venue representative of venue 104. Generated heat map information may be subsequently stored on a suitable server associated with network 108, communications network 110, or the like and forwarded to at least one mobile device 116 to allow for a sufficiently accurate position fix (e.g., via heat map signature matching, etc.), as mentioned above. Of course, such details are merely examples, and claimed subject matter is not so limited.

Although not shown, operating environment 100 may include a heat map comprising a grid of points, which may be associated with a local or global coordinate system and laid over or mapped to a floor plan of venue 104 at substantially uniform spacing (e.g., two-foot separation of adjacent grid points). Accordingly, for each wireless transmitter 102, a heat map may associate a grid point with heat map information including, for example, mean RSSI, standard deviation of RSSI, mean RTD, standard deviation of RTD, or like values, just to name a few examples, for signals transmitted between wireless transmitter 102 and the associated grid point. A scale of a grid of points (e.g., an interval or distance between adjacent points) may be varied based, at least in part, on a desired level of precision for location or navigation services, available amount of resources (e.g., memory, etc.), size of a map or rooms being covered, etc. In one particular implementation, grid points may be placed or positioned at sufficiently regular intervals covering, for example, all or a portion of venue 104. It should be noted that grid points may extend beyond venue 104, for example, while still being within a service or coverage area associated with all or part of operating environment 100. Of course, such details relating to heat maps are merely examples, and claimed subject matter is not limited in this regard.

Figure 2:
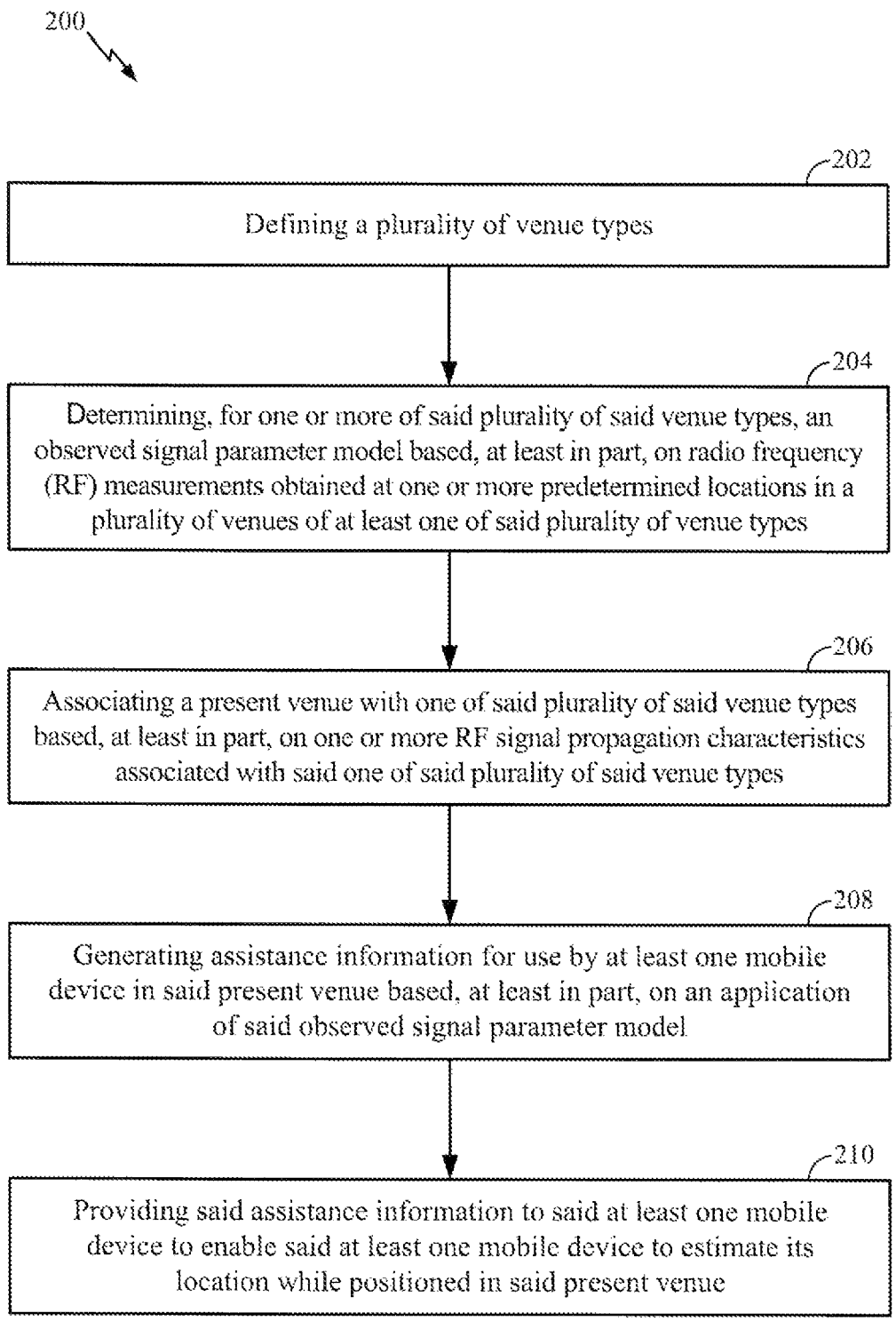
FIG. 2 is a flow diagram illustrating an example process in connection with binning venues into categories based on propagation characteristics.

With this in mind, attention is now drawn to FIG. 2, which is a flow diagram illustrating an implementation of an example process 200 for performing one or more processes or operations in connection with binning venues into categories based, at least in part, on propagation characteristics associated with such venues. It should be appreciated that even though one or more operations are illustrated or described with respect to a certain sequence, other sequences including, for example, concurrent operations may also be employed. In addition, although the description below references particular aspects or features illustrated in certain other figures (e.g., FIGS. 3-4, etc.), one or more operations may be performed with other aspects or features.

Example process 200 may begin at operation 202 with defining a plurality of venue types or categories. In certain simulations or experiments, it has been observed that similar types or categories of venues may have similar radio channel propagation characteristics due to, for example, similar physical geometry of a propagation space. Accordingly, based, at least in part, on such observations, a general trend may be identified of how, for example, a signal strength, round-trip delay time, or like characteristics of received wireless signals compare in different types or categories of venues. As will be seen, based, at least in part, on such a trend, an assumption concerning a physical geometry of a propagation space, measured signaling (e.g., RSSI, etc.) or timing (e.g., RTD, etc.) characteristics of wireless signals in different types or categories of venues may be approximated, and venue-specific predictions of radio channel path-loss behavior may be made. Accordingly, in an implementation, venue types or categories may be defined, for example, based, at least in part, on such a trend accounting for similarities of their respective radio channel propagation characteristics due to similar physical geometry of a propagation space. By way of example but not limitation and taking into account, but not necessarily limiting to, such similarities of physical radio channel characteristics of a propagation space, types or categories of venues may be defined to include, for example, an office building, a convention center, an auditorium, an amphitheater, a warehouse, a classroom building, a theater, a supermarket, a shopping mall, a sports arena, a stadium, a transit station terminal, a library, etc., just to name a few examples. Of course, claimed subject matter is not so limited. For example, in certain implementations, venue types may be defined based, at least in part, on other characteristics or factors impacting propagation or attenuation of RF signals within a venue. Such characteristics or factors may include, for example, age of a venue, applicable or enforced RF traffic patterns or network protocols (e.g., depending on a country, a part of a country, etc.), radio interference environment, density of walls, building or wall materials, or the like. Also, in one particular implementation, venues may, for example, be further defined based, at least in part, on a type or category of a venue. For example, following the above discussion, it may be initially assumed that a venue of interest, such as a shopping mall may be similar to other shopping malls, and such an assumption may be subsequently refined so as to categorize a particular shopping mall as an indoor mall, outdoor mall, etc., as will be seen. Again, this is merely an example, and claimed subject matter is not so limited, of course.

With regard to operation 204, an observed signal parameter model may be determined for one or more of a plurality of defined venue types based, at least in part, on RF measurements obtained at one or more predetermined locations in a plurality of venues of at least one of such a plurality of defined venue types. As previously mentioned, such measurements may be obtained using one or more RF-based simulations employing, for example, fingerprinting, ray tracing, or like techniques capable of determining radio channel characteristics of a propagation space associated with a venue of interest. As described below, such measurements may be advantageously utilized to develop a number of binned parameters or constants capable of approximating venue-specific radio channel path-loss behavior, which in turn may be employed to characterize or define a venue-specific observed signal parameter model.

Accordingly, an observed signal parameter model may comprise, for example, a number of binned parameters or constants, which may be initially based, at least in part, on one or more propagation channel characteristics measured or obtained (e.g., from fingerprinting, ray tracing, etc.) at a statistically significant number of venues of a similar type or category, as was indicated. More specifically, in one particular implementation, such parameters may comprise a number of constants that fit a type or category of a venue of interest (e.g., best, better, suitably, etc.) based, at least in part, on an assumption concerning a physical geometry of a propagation space associated with such a venue. As described below, one or more constants or binned parameters may be estimated based, at least in part, on an initial or known value of such a constant or binned parameter that was previously measured or observed in a venue of a similar type or category. Of course, this is merely an example, and claimed subject matter is not so limited. For example, in certain implementations, average constants or binned parameters may be estimated based, at least in part, on empirical information or knowledge with respect to a particular venue obtained via one or more crowd-sourcing techniques, as will also be seen.

In one particular implementation, an observed signal parameter model may comprise a relation capable of approximating a range as a function of some received or observed range-based or range-dependent signal characteristic, such as RSSI, for example. It should be appreciated that even though one or more processes or operations are described herein with reference to RSSI, any suitable metric representative of one or more characteristics of received wireless signals, such as RTD or RTT, for example, may be utilized. In this illustrated example, an observed signal parameter model may be characterized in the form of a signal strength-versus-distance model (e.g., RSSI vs. distance) approximating RSSI as a function of distance or range. For example, using knowledge of locations of available wireless transmitters and their respective reference or transmission power, as well as a physical structure of an indoor environment (e.g., obstacles, bends, walls, etc.), an observed signal parameter model may be derived, and a signal strength at a suitable or desired location (e.g., grid point, etc.) within a particular venue may be estimated.

Following the discussion above, in one particular implementation, an observed signal parameter model may be expressed via RSSI vs. distance model, for example, utilizing three constants or binned parameters of interest, though claimed subject matter is not so limited. Thus, here, by way of example, signal strength at any suitable or desired location within a particular venue may be estimated as a constant of a reference power or a maximum signal strength (e.g., transmitted by a known access point) plus a path-loss constant or propagation coefficient times a logarithm of distance, plus a wall-loss coefficient or constant times a logarithm of a number of walls crossed. Thus, consider:

$$RSSI(d) = SS_{max} \text{ or } P_{ref} + \gamma \text{ or } C_{prop} \times \log(\text{distance}) + C_{WL} \times \log(\text{walls crossed}) \quad (1)$$

where $SS_{max}$ or $P_{ref}$ denotes a constant of a reference power or a maximum signal strength; $\gamma$ or $C_{prop}$ denotes a path-loss constant or propagation coefficient; and $C_{WL}$ denotes a wall-loss coefficient representing a rate at which a signal drops off for a given number of wall intersections.

In this illustrated example, a propagation coefficient may be utilized as a binned parameter reflecting, for example, a density of a particular indoor environment in terms of a signal strength degradation with distance traveled (e.g., from a wireless transmitter to a mobile device, etc.). As previously mentioned, a propagation coefficient may be estimated (e.g., empirically, by an approximation, assumption, averaging, etc.) by knowing initial values of such parameters and making suitable or desired adjustments. To illustrate, in free space, a propagation coefficient $\alpha$ is known and measures at (−2). Accordingly, a propagation coefficient in a more dense or cluttered environment (e.g., a venue, etc.) may be estimated to comprise a value of at least equal or lesser than (−2), for example, based, at least in part, on an assumption that the more negative the value is, the faster a signal strength degrades with distance. Thus, a propagation coefficient or binned parameter reflecting a density (e.g., walls, obstructions, etc.) of a particular indoor environment may be estimated as (−2), (−3), (−4), and so forth. Of course, this is merely an example, and claimed subject matter is not so limited.

It should be appreciated that a propagation coefficient may be different for line-of-sight (LOS) and non-line-of-sight (non-LOS) conditions. For example, non-LOS path-loss coefficient may be estimated or selected so as to account for various multi-path or hallway effects (e.g., reflection, diffraction, etc.) associated with a particular type or category of a venue. In addition, it should be appreciated that even though only three binned parameters of interest are used in Relation 1, any suitable or desired number of binned parameters of interest may be utilized. For example, a wall material coefficient representative of how much a wireless signal attenuates for crossing a particular type of a wall may also be utilized. This binned parameter may change depending, for example, on building materials used in a particular venue. To illustrate, an office building with drywall may have a different wall material coefficient than an amphitheater with cement walls or walls with metallic plates or inclusions. Of course, these are merely examples to which claimed subject matter is not limited.

As previously mentioned, any suitable metric representative of one or more characteristics of received wireless signals may be used. For example, for estimating one or more RTD values (e.g., to generate a heat map or radio map, etc.), a processing delay associated with a particular known wireless transmitter may be utilized as a suitable binned parameter of interest. In addition, signal reflections present in multi-path propagation may have a larger impact on signal strength but a smaller impact on propagation delay. Accordingly, in the presence of multi-path propagation or reflections, round-trip delay measurements may be considered more suitable or desired than those based on the RSSI. Of course, such an observation is merely an example observation and is not intended to limit claimed subject matter.

At operation 206, a venue, such as a present or new venue, for example, may be associated with one of a plurality of venue types based, at least in part, on one or more RF signal propagation characteristics associated with such one of a plurality of venue types. As previously mentioned, similar types or categories of venues may have similar radio channel propagation characteristics due to, for example, similar geometry of a propagation space, wall materials, radio interference environment, or the like. Accordingly, similar venues may exhibit similar signal propagation or like properties and, as such, may be grouped together or binned with respect to a single applicable observed signal parameter model. Here, for example, a particular venue may be associated with a venue type selected from a finite set of venue types or categories, such as categories mentioned above based, at least in part, on similarities of a physical geometry of a propagation space, just to illustrate one possible implementation.

Figure 3:
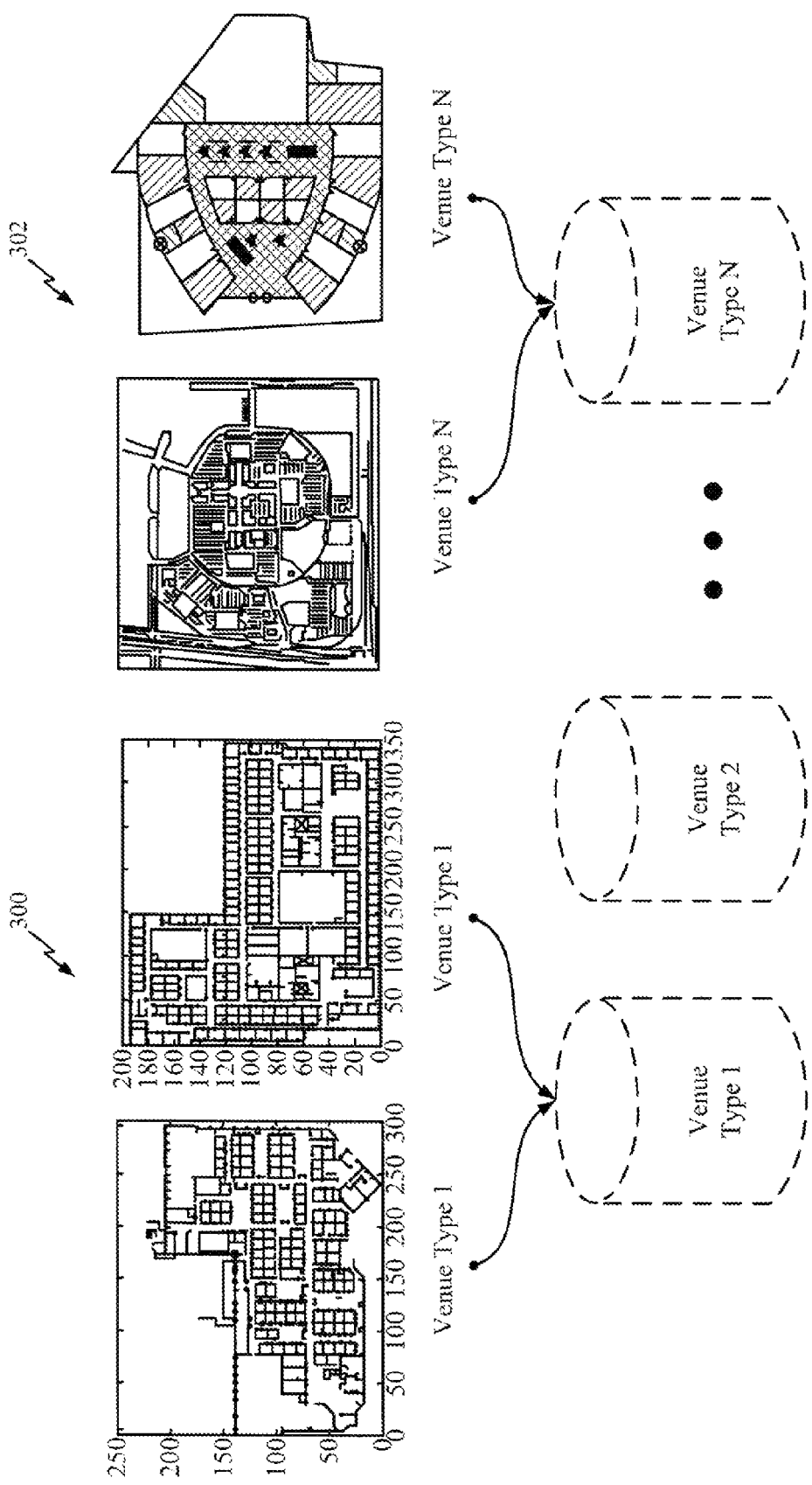
FIG. 3 is a schematic diagram illustrating an example operation where venues are binned with respect to an observed signal parameter model.

Turning now to FIG. 3, which is a diagram further illustrating the operation 206 of FIG. 2 in a non-limiting example implementation where venues may be grouped together or binned with respect to a single observed signal parameter model due to, for example, similar physical geometry of a propagation space. As seen, here, for example, office buildings, indicated generally at 300, may be binned into a discrete type or category, such as Venue Type 1 with a corresponding observed signal parameter model representative of such a type or category of venue. Likewise, shopping malls 302 may be binned into another separate or discrete venue type or category with their own (e.g., applicable, etc.) observed signal parameter model, and so forth through a Venue Type N, for example. Venues associated with a particular bin may be utilized, for example, in connection with an applicable observed signal parameter model to facilitate or support indoor navigation or location-based services, as described below. It should be appreciated that venues and respective venue types or categories shown are merely examples to which claimed subject matter is not limited. Also, it should be noted that a separate bin may comprise, for example, a number of sub-types or categories of venues within a general venue type (e.g., an outdoor mall, indoor mall, etc. within a shopping mall-type of a venue, etc.). Accordingly, a venue of interest may be matched to a corresponding venue type in a particular bin by analyzing, for example, geometry of a venue of interest (e.g., average sizes of rooms, average number of wall crossings for a randomly propagated ray, etc.), as described below.

In one particular implementation, a venue, such as a present or new venue, for example, may be categorized or associated with a venue type or category based, at least in part, on a map analysis of a floor plan of such a venue or area of interest. For example, a special purpose computing platform may execute instructions for one or more resident or web-based mapping service applications to download or otherwise extract venue information in the form of a digital map associated with a particular venue of interest. As previously mentioned, particular venue information may be extracted from a venue CAD file that may include, for example, information identifying structural features, layout, topology, etc. of a venue or area of interest (e.g., walls, rooms, doors, passageways, elevators, staircases, ladders, floors, ceilings, etc.). Although claimed subject matter is not limited in scope in this respect, a floor plan may be analyzed, for example, in an automated fashion using existing features that are common to many venue CAD files. As a way of illustration, one or more processes or operations may be performed, for example, to analyze various structural features associated with a venue or area of interest, such as a number of rooms or passageways in a venue, a square footage of room space versus non-room space, room sizes or locations, or the like. For example, if there is a sufficient number of smaller-sized rooms in a venue in relation to its size (e.g., square footage, etc.), it may be inferred that a venue or area of interest comprises an office building rather than a convention center. As another example, if a venue includes a sufficient amount or volume of corridor space in relation to its room space, such a venue may be categorized as a shopping mall. As a way of illustration, office buildings may have a sufficient number of small spaces (e.g., rooms, etc.) with longer corridors, whereas shopping malls may have higher ceilings with wider corridors, as another non-limiting example. Of course, such details are merely examples, and claimed subject matter is not limited in this regard.

Optionally or alternatively, a suitable application may narrow down a list of possible choices with respect to types of venues that a venue or area of interest may be categorized or binned into, thus, providing a choice of selecting a more appropriate venue type. For example, a venue may be initially associated with a general venue type or category based, at least in part, on a venue information (e.g., obtained from a server, etc.) or description of a venue (e.g., inputted into a mobile device, etc.), or the like. Based, at least in part, on such initial association of a venue with a general venue type, a venue may be further categorized (e.g., more appropriately, etc.) by further analyzing a floor plan of a venue (e.g., a geometry of a venue, average sizes of rooms, average number of wall crossings for a randomly propagated ray, etc.), or the like. To illustrate, a venue of interest may be initially associated with a general shopping mall-type bin, and may be subsequently categorized in response to signals received from a user interface associated with a mobile device (e.g., via a user input from drop-down list of malls, etc.) or from a server (e.g., via a map analysis, etc.) as an indoor-type mall, outdoor-type mall, etc., if needed. Of course, claimed subject matter is not so limited.

Referring back to the flow diagram of FIG. 2, at operation 204, having associated a particular venue of interest with at least one venue type, assistance information for use by at least one mobile device may be generated. Assistance information may, for example, be generated based, at least in part, on an application of an observed signal parameter model associated with a particular venue type or category.

More specifically, in one particular implementation, assistance information may comprise, for example, heat map information generated for a new venue using one or more simulations or modeling techniques performed for suitable or desired locations (e.g., grid points, etc.) in an effective or efficient manner. As previously mentioned, to obtain observed signal characteristics (e.g., RSSI, RTD, etc.) for suitable or desired locations, one or more binned parameters of interest, such as LOS or non-LOS distance (e.g., to a wireless transmitter, etc.), a number of obstacles or walls to be crossed, etc. may be determined and combined in a single mathematical formula, such as, for example, Relation 1 discussed above. In the particular example of venue 104 of FIG. 1, for example, an LOS distance may comprise a distance from mobile device 116$b$ to wireless transmitter 102$b$, and non-LOS distance may comprise a distance from mobile device 116 to wireless transmitter 102$a$. Of course, these are merely examples, and claimed subject matter is not so limited. In addition, a number or types of obstacles (e.g., walls, bends, etc.) a wireless signal (e.g., from available wireless transmitters, etc.) is to cross may also be determined (e.g., via a floor plan, etc.), and, thus, appropriate coefficients or binned parameters may be selected or inputted. Based, at least in part, on a type of a new venue (e.g., an office building-type venue of FIG. 1, etc.), an appropriate or applicable observed signal parameter model may be selected (e.g., "Office Building" type, etc.) and applied to allow a special purpose computing platform to perform one or more requisite calculations, for example, generating one or more heat map values for a suitable or desired location (e.g., grid points, etc.).

In another implementation, assistance information may comprise, for example, one or more binned parameters associated with a particular observed signal parameter model that may be communicated to a mobile device, as previously mentioned. Here, for example, such assistance information may also be generated using one or more operations or processes described in connection with Relation 1 above. Accordingly, as illustrated in these examples, attenuation or propagation characteristics for a new venue may be summarized or approximated in just a few binned parameters that may be provided for use to a mobile device. In this manner, a new venue simulation may be accomplished in less time, with fewer computing resources or overhead, etc., thus, making it more efficient or effective than, for example, ray tracing or fingerprinting.

At operation 210, assistance information may be provided for use to at least one mobile device while positioned in a venue of interest, such as a present or new venue, for example, to enable such a mobile device to estimate its location using one or more positioning techniques or operations. For example, in one particular implementation, assistance information may be provided to a mobile device, in whole or in part, in the form of one or more binned parameters associated with an applicable observed signal parameter model to facilitate or support a trilateration-based operation, as previously mentioned. As was also indicated, in another implementation, assistance information may be provided in the form of heat map information to allow a mobile device to perform requisite calculations in connection with heat map signature matching for a sufficiently accurate position fix. Of course, these are merely examples, and claimed subject matter is not so limited.

In one implementation, assistance information associated with a particular venue or area of interest may be stored, for example, in one or more memory locations in connection with example process 200. For example, such assistance information may be stored with reference to one or more grid points associated with a heat map overlaid or mapped to a floor plan of a venue of interest, though claimed subject matter is not so limited. Assistance information may reflect, for example, initial estimated location of a mobile device that may have an amount of error due to a number of factors (e.g., timing calibration, location of wireless transmitters is changed or unknown, etc.). Accordingly, in an implementation, assistance information may, for example, be further updated or refined over time, in whole or in part, through one or more crowd-sourcing techniques. For example, suitable or desired assistance information may be updated or refined over time based, at least in part, on suitable or desired measurements that mobile devices may take while positioned within a venue or area of interest. More specifically, mall shoppers or patrons, for example, may execute desired tasks (e.g., gather requisite measurements, send back information, etc.) and be rewarded in some manner for doing so, just to illustrate one possible example. Optionally or alternatively, a suitable location, navigation, etc. service may extract suitable or desired information from a location-aware unit associated with mobile devices, for example, with permission from their users. Accordingly, the more updates a suitable service or server receives, the more precise information may be learned with respect to a particular venue or area of interest, thus, resulting in better mapping, positioning, navigating, etc. Such a technique may allow for a sufficient flexibility since suitable or desired assistance information, such as binned parameters of interest, for example, may be refined or narrowed down from a large bin of venue types or categories (e.g., shopping malls, etc.) to a particular or specific venue (e.g., a particular mall, etc.). Of course, such details are merely examples, and claimed subject matter is not limited in this regard.

Figure 4:
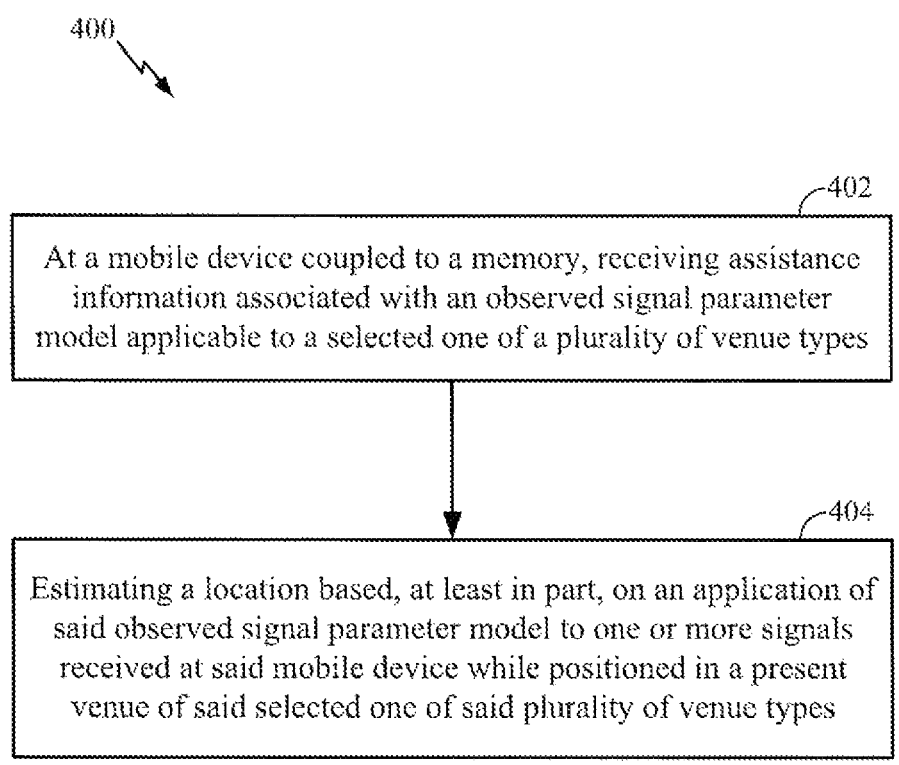
FIG. 4 is a flow diagram illustrating another example process in connection with binning venues into categories based on propagation characteristics.

Turning now to FIG. 4, which is a flow diagram illustrating another implementation of an example process 400 for performing one or more processes or operations in connection with binning venues into categories based, at least in part, on wireless signal propagation characteristics associated with such venues. Again, it should also be appreciated that even though one or more operations are illustrated or described with respect to a certain sequence, other sequences including, for example, concurrent operations may also be employed. In addition, although the description below references particular aspects or features illustrated in certain other figures (e.g., FIGS. 3-4, etc.), one or more operations may be performed with other aspects or features.

At operation 402, assistance information associated with an observed signal parameter model applicable to a selected one of a plurality of venue types may be received at or by a mobile device. As previously mentioned, assistance information may be communicated to a mobile device from a suitable server, such as location, navigation, information server, or the like. In an implementation that utilizes a trilateration-based approach, such assistance information may comprise, for example, identities or locations of available wireless transmitters (e.g., access points, location beacons, femtocells, etc.) as well as one or more binned parameters or constants associated with an applicable observed signal parameter model, just to name a few examples. Such binned parameters may be associated with a venue type, for example, selected from a finite set of venue types or categories, such as categories mentioned above based, at least in part, on similarities of a physical geometry of a propagation space, though claimed subject matter is not so limited, of course. As was also indicated, in an implementation that utilizes a heat map positioning technique, assistance information may comprise, for example, heat map information that may be used by one or more mobile devices to perform requisite calculations in connection with heat map signature matching to allow for a sufficiently accurate position fix.

With regard to operation 404, a mobile device may estimate its location based, at least in part, on an application of an observed signal parameter model to one or more signals received at such a mobile device while positioned in a venue of a selected one of a plurality of venue types, such as, for example, a present or new venue. For example, an observed signal parameter model may utilize one or more binned parameters applicable to a particular type or category of venue defining a relationship between one or more characteristics of a wireless signal received from a wireless transmitter (e.g., RSSI, RTD, etc.) and a range to such a transmitter, as previously mentioned. Thus, using such parameters, a mobile device may perform requisite calculations to obtain one or more range measurements and estimate its position with sufficient accuracy utilizing, for example, known trilateration-based techniques, as previously mentioned. Optionally or alternatively, a mobile device may estimate its location by performing, for example, a heat map signature matching operation using heat map information developed using an applicable observed signal parameter model to allow for a sufficiently accurate position fix, as was also indicated. Accordingly, an observed signal parameter model-based assistance information may, for example, enable navigation or location-based services in an indoor environment or like partially or substantially enclosed areas in an effective or efficient manner.

In one particular implementation, a categorization of a particular venue of interest (e.g., a present or new venue, etc.) or associating such a venue with a particular discrete type or category of venues (e.g., bins) may be performed at or on a mobile device. For example, venue information may be inputted into a mobile device (e.g., by a user, etc.). By way of example, a user may operate a mobile device to perform a categorization of a particular venue via a user display associated with a mobile device, though claimed subject matter is not so limited. A display may comprise, for example, any suitable application window as a graphical user interface (GUI) for a computing application or platform to manage or otherwise manipulate visual content. As used herein, a "graphical user interface" (GUI) may refer to a program interface that utilizes displayed graphical information to allow a user to control or operate a special purpose computing platform associated with a mobile device, for example, by a pointer or a pointing device. A mobile device and a display are typically specific hardware, whereas a GUI is typically an application designed to be executed by such a specific hardware. In some implementations, a mobile device may also comprise a network browser or a similar application that enables the mobile device to interact with display information located on a network, such as the Internet. Of course, various implementations of GUI are possible, and it is not intended to limit claimed subject matter to a particular implementation.

Following the above discussion, in one implementation, a user may operate a mobile device to categorize a venue of interest or otherwise select a particular type of a venue (e.g., while in a venue of a similar type or category, in a venue to be simulated, etc.) from a finite set of venue types or categories so as to associate such a venue with an applicable bin. Such a set of venue types may be accessed or obtained, for example, by retrieving it from memory, by receiving it over a suitable communication link (e.g., wireless, wired, etc.), or the like. As a way of illustration, a user may be presented with one or more user-selectable information fields (e.g., on a user display, etc.), such as, for example, a drop-down information menu from which a user may select a particular type or category of a venue from a listing of venue types that may be pertinent to a particular venue of interest, just to illustrate one possible implementation. For example, a user may recognize or infer (e.g., by looking at a floor plan, etc.) that a venue of interest comprises an office building, convention center, sports arena, etc. and, thus, may make an appropriate categorization (e.g., manually, via a drop-down menu, etc.) on or at a mobile device to associate such a venue with an applicable bin. It should be appreciated that a user may categorize a venue using any suitable routines or operations that may be facilitated or supported, at least in part, by a special purpose computing platform associated with a mobile device or by an operating environment, such as operating environment of FIG. 1, for example. In certain implementations, a mobile device may comprise, for example, an editable combo-box or like combination of a drop-down menu and an input-line textbox, which may allow a user to input a particular type of a venue directly into an input line (e.g., enter "office building," etc.) or to select a suitable venue type from a list of existing drop-down options. In addition, it should be noted that a user may categorize a particular venue through commands that are processed using voice-processing or related technology, though claimed subject matter is not so limited, of course.

Figure 5A:
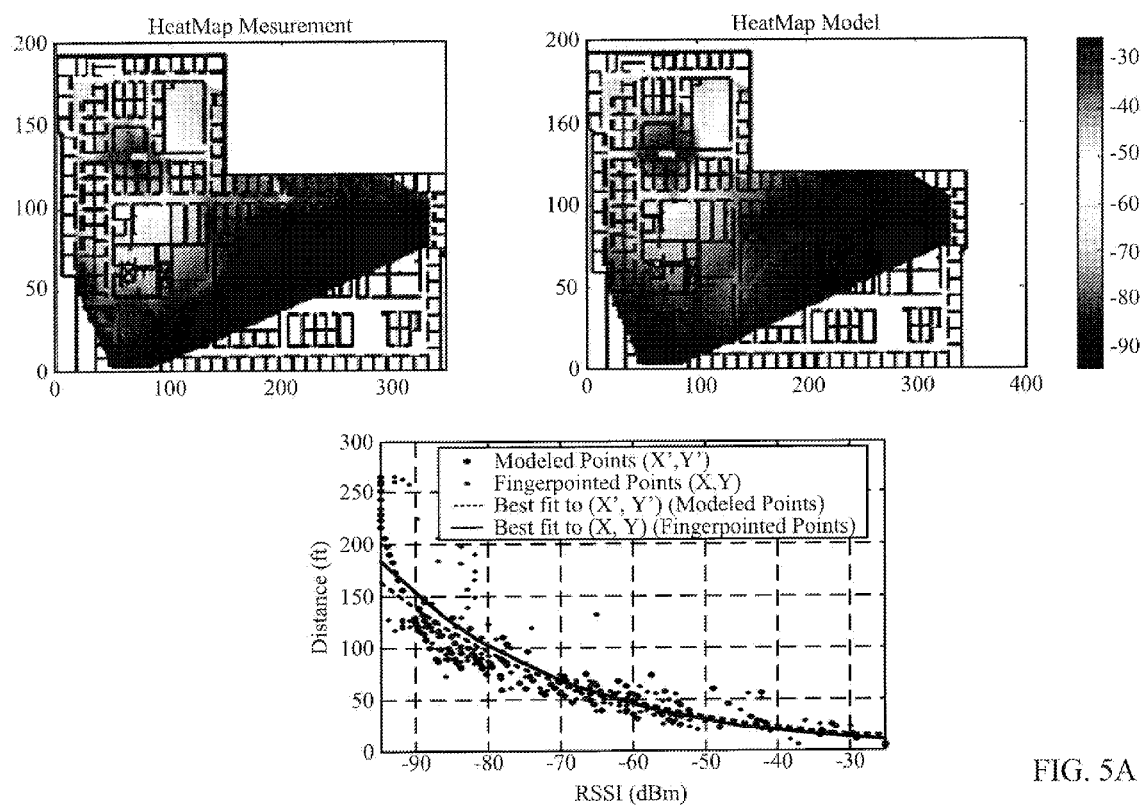
FIGS. 5A and 5B are plots and RSSI vs. distance curves illustrating performance and verification results.
Figure 5B:
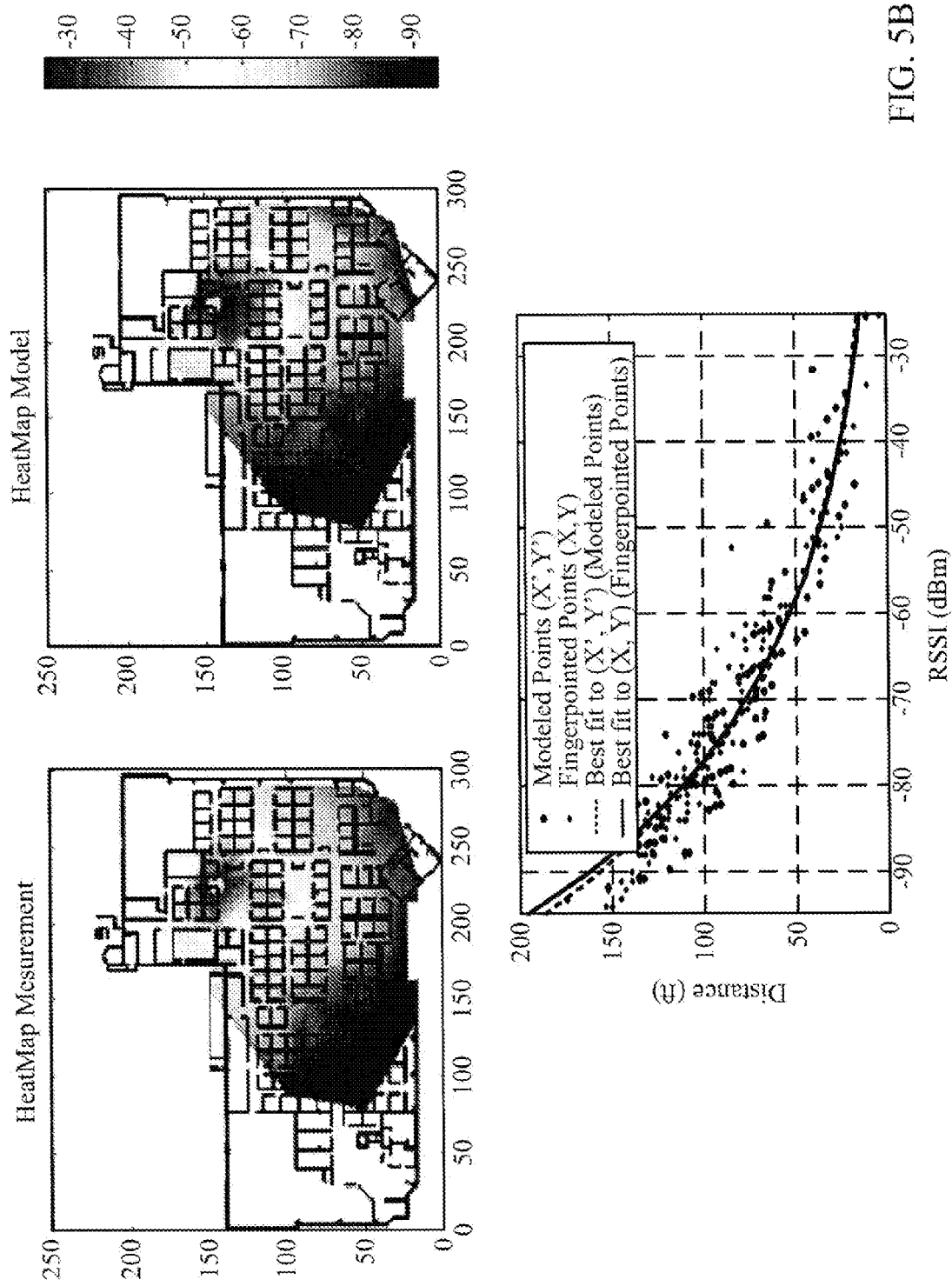

By way of example but not limitation, some examples of RSSI heat maps generated or obtained from fingerprinted measurements and by applying a particular observed signal parameter model in connection with certain simulations or experiments are illustrated in FIGS. 5A and 5B. It should be appreciated that RSSI measurements as well as RSSI vs. distance curves shown are merely examples to which claimed subject matter is not limited. Thus, in certain simulations or experiments, extensive set of RSSI measurements were taken at a venue or area of interest, and observed signal parameters were fit on top of the measurements. It should be noted that certain parameters may be optimized, at least in part, for an approximate fit for the measurements including, for example, a LOS path coefficient, non-LOS path coefficient, wall-loss coefficient, etc. As particularly seen in FIG. 5A, it appeared that an observed signal parameter model may provide a reasonable RSSI vs. distance curve, which, in turn, may allow for a sufficiently accurate position fix. As further illustrated in FIG. 5B, for verification purposes in connection with one particular simulation or experiment, another set of RSSI measurements were taken at another venue or area of interest of a similar type or category. Here, it appeared that based, at least in part, on a knowledge of a physical geometry of a venue's propagation space (e.g., obtained from maps, etc.) and approximate RF characteristics of received wireless signals, an observed signal parameter model may prove beneficial in approximating a range as a function of RSSI. Accordingly, example heat map distribution plots associated with simulated venues or areas of interest may indicate that such venues may be grouped into a single bin for modeling. Of course, such details relating to venues or areas of interest are merely examples, and claimed subject matter is not limited in this regard.

Figure 6:
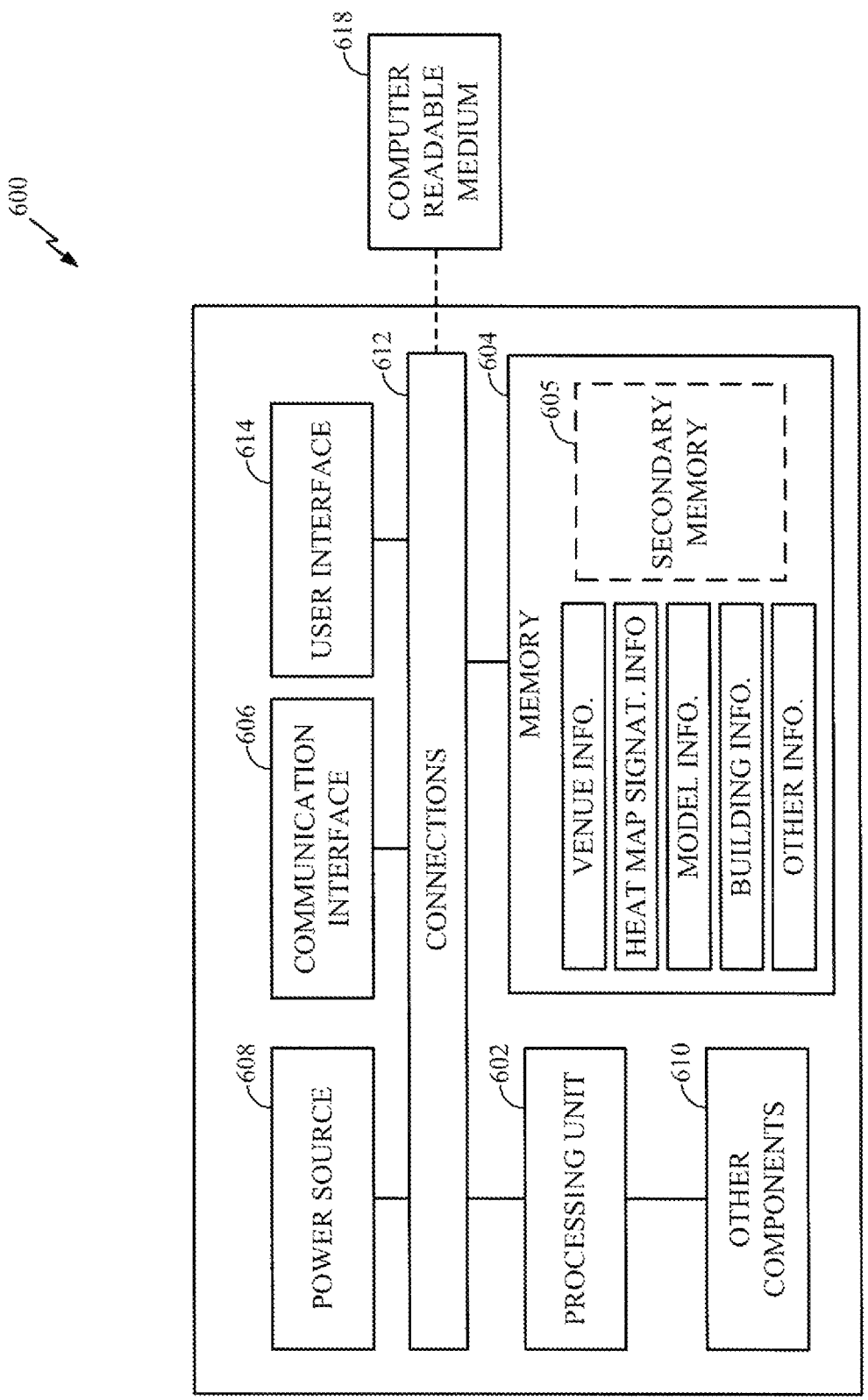
FIG. 6 is a schematic diagram illustrating an implementation of an example device capable of implementing a process in connection with binning venues into categories based on propagation characteristics.

FIG. 6 is a schematic diagram illustrating an implementation of an example device 600 capable of partially or substantially implementing one or more processes or operations in connection with binning venues into categories based, at least in part, on signal propagation characteristics associated with such venues. In an implementation, device 600 may comprise, for example, any electronic device having at least one processor and memory that may be configurable to exchange data or information over any suitable communications network. For example, device 600 may include one or more computing devices or platforms associated with, for example, a laptop computer, a desktop computer, a tablet PC, a cellular telephone, access points, transceiver chips, an e-book reader, a workstation, a server device, data storage units, or the like. In other example implementations, device 600 may take the form of one or more integrated circuits, circuit boards, or the like that may be operatively enabled for use in another device. It should be appreciated that all or part of various components shown in connection with example device 600, and the processes or operations as described herein, may be implemented using or otherwise include hardware, firmware, or any combination thereof along with software. It should also be noted that example device 600 may include more, fewer, or different components from those that are illustrated.

As illustrated, example device 600 may include at least one processing unit 602, memory 604, communication interface 606, power source 608, and one or more other components, indicated generally at 610, for example, so as to facilitate or support one or more processes or operations in connection with binning venues into categories. Processing unit 602 may be implemented in hardware or a combination of hardware and software. Processing unit 602 may be representative of one or more circuits configurable to perform at least a portion of information computing technique or process. By way of example but not limitation, processing unit 602 may include one or more processors, controllers, microprocessors, microcontrollers, application specific integrated circuits, digital signal processors, programmable logic devices, field programmable gate arrays, and the like, or any combination thereof.

Memory 604 may store, contain, or otherwise provide access to computer-readable instructions (e.g., a program, an application, etc. or portion(s) thereof; operational data or information structures; processor-executable instructions; code; some combination thereof; and so forth) that may be executable by processing unit 602. Execution of such instructions by processing unit 602 may transform example device 600 into a special purpose computing device, apparatus, platform, some combination thereof, and so forth. Memory 604 may represent any information storage medium. For example, memory 604 may include a primary memory and a secondary memory, indicated generally in dashed lines at 605. As seen, a primary memory may include, for example, a random access memory, read only memory, etc. and may comprise venue information, heat map or radio map signature information, observed signal parameter model information, or other suitable or desires information facilitating or supporting one or more processes or operations in connection with binning venues into categories. While illustrated in this example as being separate from processing unit 602, it should be appreciated that all or part of memory 604 may be provided within or otherwise co-located/coupled with processing unit 602.

Secondary memory 605 may include, for example, the same or similar type of memory as primary memory or one or more information storage devices or systems, such as, for example, a disk drive, an optical disc drive, a tape drive, a solid state memory drive, etc. In certain implementations, secondary memory 605 may be operatively receptive of, or otherwise enabled to be coupled to, a computer-readable medium 618. Computer-readable medium 618 may include, for example, any medium that can store or provide access to information, code or instructions (e.g., an article of manufacture, etc.) for example device 600.

Computer-readable medium 618 may be accessed by processing unit 602, for example. As such, in certain example implementations, the methods or apparatuses may take the form, in whole or in part, of a computer-readable medium that may include computer-implementable instructions stored thereon, which, if executed by at least one processing unit or other like circuitry, may enable processing unit 602 or the other like circuitry to perform all or portions of RF signal measuring processes, location determination processes, trilateration-based or heat map signature-based processes, or any processes to facilitate or otherwise support binning venue into categories. In certain example implementations, processing unit 602 may be capable of performing or supporting other functions, for example, associated with operating environment 100 of FIG. 1, such as communication, routing, etc.

Example device 600 may further include a communication interface 606 (e.g., wireless transceiver, modem, antenna, etc.) to allow for communication with one or more other devices or systems over one or more wired or wireless communication links. Communication interface 606 may provide one or more interfaces between device 600 and other devices. Communication interface 606 may be capable of requesting, receiving, or providing suitable or desired location, navigation, assistance, or like information. Assistance information may include any suitable information facilitating or supporting position estimations utilizing, for example, a trilateration-based, heat map or radio map positioning-based operations or techniques, as previously mentioned. In addition, in certain implementations, assistance information may include, for example, routing graph information, venue information, connectivity graph information, location information, as well as associated annotation information, or the like. As was indicated communication interface 606 may include a wireless transceiver (e.g., transmitter and receiver), a radio, an antenna, a wired interface connector or other such apparatus, some combination thereof, etc. to communicate wireless or wired signals over respective wireless or wired communication links.

Example device 600 may also include a power source 608 to provide power to some or all of the components or circuitry of example device 600. Power source 608 may be a portable power source, such as a battery, for example, or may comprise a fixed power source, such as an outlet (e.g. in a house, electric charging station, car, etc.). It should be appreciated that power source 608 may be integrated into (e.g., built-in, etc.) or otherwise supported by (e.g., stand-alone, etc.) example device 600. Power source 608 may also be a transportable power source, such as a solar or carbon-fuel-based generator. Although not shown, it should be noted that components or circuitry of example device 600 may include an analog-to-digital converter (ADC) for digitizing output signals, although claimed subject matter is not so limited.

Example device 600 may also include one or more connections 612 (e.g., buses, lines, conductors, optic fibers, etc.) to operatively couple various circuits or components, such as one or more other components 610, for example, together, and, optionally or alternatively, a user interface 614 (e.g., display, touch screen, keypad, buttons, knobs, microphone, speaker, trackball, data port, etc.) to receive requisite input or provide suitable information to a user. Other components 610, if present, may comprise one or more other miscellaneous sensors, features, or the like.

Although not shown, in certain example implementations, example device 600 may include a location-aware or tracking unit associated with a Global Navigation Satellite System (GNSS) and capable of providing or supporting some form of a location/velocity/time estimation processes with regard to device 600 or other devices operatively coupled to device 600 based, at least in part, on one or more transmitted or received wireless signals (e.g., from space vehicles, satellites, ground-based transceivers, wireless transmitters, etc.). A location-aware or tracking unit may comprise, for example, at least one receiver or transmitter capable of receiving or transmitting wireless signals in some manner, though claimed subject matter is not so limited.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

Wireless communication techniques described herein may be implemented using various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), or the like.

Also, computer instructions/code/data may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   processing, by one or more processors, first radio frequency (RF) measurements obtained from one or more wireless devices at one or more predetermined locations in a plurality of venues, wherein individual venues of the plurality of venues comprise a physical place or locale;
   identifying, by said one or more processors, a plurality of venue types for said plurality of venues based at least in part on structural features of said plurality of venues, wherein a first venue type of said plurality of venue types is identified based on a first subset of said plurality of venues and a second venue type of said plurality of venue types is identified based on a second subset of said plurality of venues; and
   determining, by said one or more processors, for at least said first venue type, a signal parameter model based, at least in part, on said first RF measurements obtained within said first subset of said plurality of venues.

2. The method of claim 1, and further comprising:
acquiring, by said one or more processors, second RF measurements obtained within a present venue, wherein said present venue is separate from the plurality of venues; and
associating, by said one or more processors, said present venue with one of said plurality of said venue types based, at least in part, on a comparison between said first and second RF signal measurements.

3. The method of claim 2, and further comprising:
generating assistance information, by said one or more processors, for use by at least one mobile device in said present venue based, at least in part, on said signal parameter model.

4. The method of claim 3, and further comprising:
initiating transmission, by said one or more processors, or said assistance information to said at least one mobile device to enable said at least one mobile device to estimate its location while positioned in said present venue.

5. The method of claim 3, wherein said assistance information comprises information for performing a heat map signature matching operation.

6. The method of claim 3, wherein said assistance information comprises information for performing a position determination operation.

7. The method of claim 6, wherein said information for performing a position determination operation comprises information for performing at least one of the following: a trilateration operation; a triangulation operation; a multilateration operation; or any combination thereof.

8. The method of claim 1, wherein said plurality of said venue types are further identified based, at least in part, on a venue function.

9. The method of claim 8, wherein said venue function comprises a function associated with at least one of the following: an auditorium; an amphitheater; a warehouse; an office building; a classroom building; a theater; a supermarket; a shopping mall; a convention center; a sports arena; a stadium; a transit station terminal; a library; or any combination thereof.

10. The method of claim 1, wherein said plurality of venue types are further identified, at least in part, on a building material type.

11. The method of claim 1, wherein said plurality of venue types are identified, at least in part, on a venue geometry.

12. An apparatus comprising:
one or more processors programmed with instructions to:
processing first radio frequency (RF) measurements obtained from one or more wireless devices at one or more predetermined locations in a plurality of venues, wherein individual venues of the plurality of venues comprise a physical place or locale;
identify a plurality of venue types for said plurality of venues based at least in part on structural features of said plurality of venues, wherein a first venue type of said plurality of venue types is identified based on a first subset of said plurality of venues and a second venue type of said plurality of venue types is identified based on a second subset of said plurality of venues; and
determine, for at least said first venue type, a signal parameter model based, at least in part, on said first RF measurements obtained within said first subset of said plurality of venues.

13. The apparatus of claim 12, wherein said one or more processors are further programmed with instructions to:
acquiring second RF measurements obtained within a present venue, wherein said present venue is separate from the plurality of venues; and
associate said present venue with one of said plurality of said venue types based, at least in part, on a comparison between said first and second RF signal measurements.

14. The apparatus of claim 13, wherein said one or more processors are further programmed with instructions to:
generate assistance information for use by at least one mobile device in said present venue based, at least in part, on said signal parameter model.

15. The apparatus of claim 14, wherein said one or more processors are further programmed with instructions to:
initiate transmission of said assistance information to said at least one mobile device to enable said at least one mobile device to estimate its location while positioned in said present venue.

16. The apparatus of claim 14, wherein said assistance information comprises information for performing a heat map signature matching operation.

17. The apparatus of claim 14, wherein said assistance information comprises information for performing a position determination operation.

18. The apparatus of claim 17, wherein said information for performing a position determination operation comprises information for performing at least one of the following: a trilateration operation; a triangulation operation; a multilateration operation; or any combination thereof.

19. The apparatus of claim 12, wherein said plurality of venue types are further identified, at least in part, on a venue function.

20. The apparatus of claim 19, wherein said venue function comprises a function associated with at least one of the following: an auditorium; an amphitheater; a warehouse; an office building; a classroom building; a theater; a supermarket; a shopping mall; a convention center; a sports arena; a stadium; a transit station terminal; a library; or any combination thereof.

21. The apparatus of claim 12, wherein said plurality of venue types are further identified, at least in part, on a building material type.

22. The apparatus of claim 12, wherein said plurality of venue types are further identified, at least in part, on a venue geometry.

23. An apparatus comprising:
means for processing first radio frequency (RF) measurements obtained from one or more wireless devices at one or more predetermined locations in a plurality of venues, wherein individual venues of the plurality of venues comprise a physical place or locale;
means for identifying a plurality of venue types for said plurality of venues based at least in part on structural features of said plurality of venues, wherein a first venue type of said plurality of venue types is identified based on a first subset of said plurality of venues and a second venue type of said plurality of venue types is identified based on a second subset of said plurality of venues; and
means for determining, for at least said first venue type, a signal parameter model based, at least in part, on said first radio frequency (RF) measurements obtained within said first subset of said plurality of venues.

24. The apparatus of claim 23, and further comprising:
means for associating a present venue with one of said plurality of said venue types based, at least in part, on one or more RF signal propagation characteristics associated with said one of said plurality of said venue types.

25. The apparatus of claim 24, and further comprising:
means for generating assistance information for use by at least one mobile device in said present venue based, at least in part, on an application of said observed signal parameter model.

26. The apparatus of claim 25, and further comprising:
means for providing said assistance information to said at least one mobile device to enable said at least one mobile device to estimate its location while positioned in said present venue.

27. The apparatus of claim 25, wherein said assistance information comprises information for performing a heat map signature matching operation.

28. The apparatus of claim 25, wherein said assistance information comprises information for performing at least one of the following: a trilateration operation; a triangulation operation; a multilateration operation; or any combination thereof.

29. An article comprising:
a storage medium having instructions stored thereon executable by a special purpose computing platform to:
process first radio frequency (RF) measurements obtained from one or more wireless devices at one or more predetermined locations in a plurality of venues, wherein individual venues of the plurality of venues comprise a physical place or locale;
identify a plurality of venue types for said plurality of venues based at least in part on structural features of said plurality of venues, wherein a first venue type of said plurality of venue types is identified based on a first subset of said plurality of venues and a second venue type of said plurality of venue types is identified based on a second subset of said plurality of venues; and
determine, for at least said first venue type, a signal parameter model based, at least in part, on said first radio frequency (RF) measurements obtained within said first subset of said plurality of venues.

30. The article of claim 29, wherein said storage medium further includes instructions to:
acquire second RF measurements obtained within a present venue, wherein said present venue is separate from the plurality of venues; and
associate said present venue with one of said plurality of said venue types based, at least in part, on a comparison between said first and second RF signal measurements.

31. The article of claim 30, wherein said storage medium further includes instructions to:
generate assistance information for use by at least one mobile device in said present venue based, at least in part, on said signal parameter model.

32. The article of claim 31, wherein said storage medium further includes instructions to:
initiate transmission of said assistance information to said at least one mobile device to enable said at least one mobile device to estimate its location while positioned in said present venue.

33. The article of claim 31, wherein said assistance information comprises information for performing a heat map signature matching operation.

34. The article of claim 31, wherein said assistance information comprises information for performing at least one of the following: a trilateration operation; a triangulation operation; a multilateration operation; or any combination thereof.

* * * * *